(12) United States Patent
Inagawa et al.

(10) Patent No.: US 6,774,590 B2
(45) Date of Patent: Aug. 10, 2004

(54) METHOD FOR STARTING AN ELECTRIC BRUSHLESS ROTATING MACHINE FOR DRIVING AN INTERNAL COMBUSTION ENGINE

(75) Inventors: Toshinori Inagawa, Saitama (JP); Yoshihiro Iijima, Saitama (JP); Mitsuru Nakamura, Saitama (JP); Tsutomu Wakitani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 93 days.

(21) Appl. No.: 10/282,053

(22) Filed: Oct. 29, 2002

(65) Prior Publication Data

US 2003/0107348 A1 Jun. 12, 2003

(30) Foreign Application Priority Data

Dec. 11, 2001 (JP) .................................. P2001-377151
Dec. 11, 2001 (JP) .................................. P2001-377152

(51) Int. Cl.[7] .............................................. H02P 6/22
(52) U.S. Cl. ....................... 318/139; 318/430; 318/431
(58) Field of Search ............................... 318/138, 139, 318/254, 430, 431, 439, 720, 721, 722, 724

(56) References Cited

U.S. PATENT DOCUMENTS

| 3,902,073 | A | * | 8/1975 | Lafuze ........................ 290/46 |
| 4,426,585 | A | * | 1/1984 | Bigalke ..................... 290/38 B |
| 4,446,406 | A | | 5/1984 | Uzuka |
| 4,455,513 | A | * | 6/1984 | Fulton et al. ................ 318/138 |
| 4,484,114 | A | * | 11/1984 | Ebbs ........................... 318/138 |
| 5,206,567 | A | | 4/1993 | Sakurai et al. |
| 5,572,097 | A | | 11/1996 | Cameron |
| 5,814,957 | A | | 9/1998 | Yoshida |
| 6,034,494 | A | | 3/2000 | Kitamine et al. |
| 6,160,367 | A | | 12/2000 | Higashi et al. |
| 6,566,830 | B2 | * | 5/2003 | Walters ....................... 318/445 |

FOREIGN PATENT DOCUMENTS

| DE | 199 53 265 A1 | 5/2001 |
| JP | 5-24760 | 8/1993 |
| JP | 2000-156962 | 6/2000 |
| JP | 2000-316298 | 11/2000 |

* cited by examiner

*Primary Examiner*—Bentsu Ro
(74) *Attorney, Agent, or Firm*—Westerman, Hattori, Daniels & Adrian, LLP (57) ABSTRACT

A method of starting an electric brushless rotating machine is provided where a large startup torque is obtained with no use of any rotor position detecting device and the forced commutation can be switched to normal energization easily and smoothly. At the startup stage, any two of three-phase stator windings are energized for initial magnetization (Steps S1 and S2) to hold the magnetic rotor at a position. Then, the windings of the phases are energized in a sequence while gradually increasing the level of the energization (Step S3). During the forced commutation, the magnetic rotor is rotated by a rotating position detecting signal generated from a voltage signal induced on the not-energized windings to drive the output shaft of an engine. Then, the energization is canceled when the number of revolutions in the internal combustion engine determined from the rotating position detecting signal reaches its predetermined level.

7 Claims, 9 Drawing Sheets

Fig. 12

METHOD FOR STARTING AN ELECTRIC BRUSHLESS ROTATING MACHINE FOR DRIVING AN INTERNAL COMBUSTION ENGINE

BACKGROUND OF THE INVENTION

1. Field of the Invention

The present invention relates to a method of starting an electric brushless rotating machine and particularly to a method of starting an electric brushless rotating machine appropriated for generating a large torque at the startup stage.

2. Description of the Related Art

A brushless motor is provided as an electric rotating machine where the energization of three-phase stator windings for driving a rotating member (referred to as a rotor hereinafter) is switched from one to another whenever the rotor rotates through 120 degrees of the electric angle. Such a conventional brushless motor has commonly a position detector element such as a Hall device for detecting the rotating position of the rotor. Recently, another type of brushless motor which includes no position detector element has been developed in response to the demand for downsizing of the brushless motor.

For example, a brushless motor is disclosed in Japanese Patent Publication (Heisei)5-24760 where, in view of any two different phases of the three-phase stator windings being energized in a sequence, the voltage induced at the remaining not-energized phase is measured and used for calculating the rotating position of the rotor. As the brushless motor produces non of the induced voltage at the startup stage which is used for calculating the rotating position of the rotor, its rotor has slightly be driven by forced commutation. The forced commutation means that any two desired phases of the stator, e.g. U and V, are energized regardless of the position of the rotor (which is hence referred to as one-phase energization hereinafter). The position of the rotor is detected from the induced voltage and then a common procedure of the energization will follow in relation to the detected rotor position.

Figure 13:
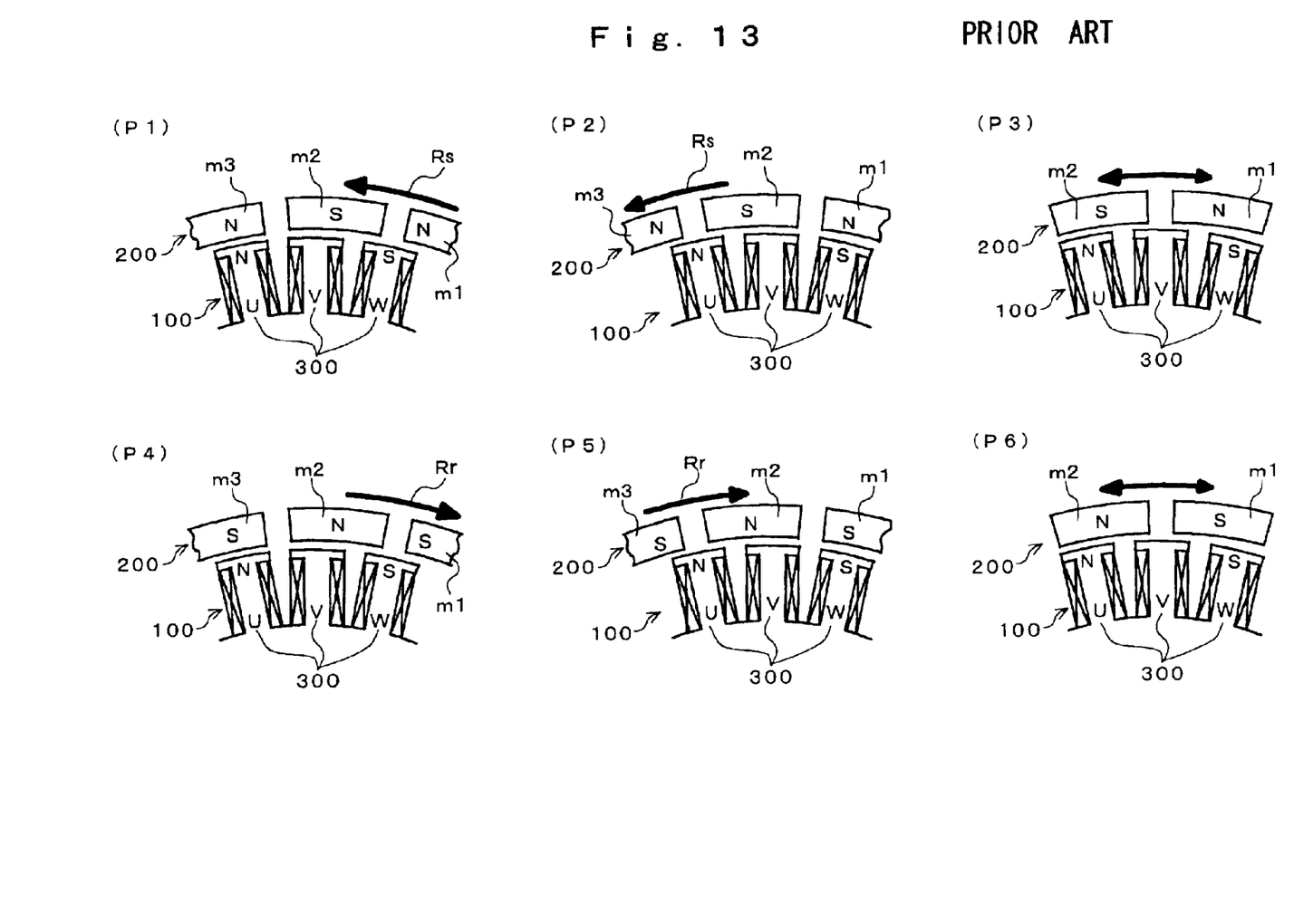
FIG. 13 illustrates a relationship between the stator and the rotor which are held spontaneously.

The positional relationship between the rotor and the stator when they stop their movement as the motor has been deenergized is determined by attracting and repulsing forces of the magnets. For example, when the motor is an outer rotor type brushless motor having three-phase stator windings, its positional relationship between the rotor and the stator is expressed by six different pausing modes, p1 to p6, shown in FIG. 13. FIG. 13 illustrates an arrangement of a primary part of the brushless motor in addition to the six pausing modes of the position relationship between the rotor and the stator of which the movement stops as the motor has been deenergized.

As shown in FIG. 13, the counter clockwise direction is the forward direction Rs of the rotor while the clockwise direction is the reverse direction Rr. The stator 100 and the rotor 200 of the brushless motor are disposed inward and outward respectively. The stator 100 has magnetic poles 300 of U, V, and W phase. The magnetic poles 300 incorporate windings. The rotor 200 has a row of permanent magnets m1, m2, m3, . . . of which the polarity alternates between N and S along the circumference.

A movement of the rotor from the initial pausing mode p1 to p6 when is driven by forced commutation between U phase and W phase without initial magnetization will be explained. When an electric current is supplied through U phase to W phase, the U phase is magnetized to positive (N) pole and the W phase is magnetized to negative (S) pole.

At the initial pausing mode p1, the magnet m2 at S is attracted by the U phase at N but repulsed by the W phase at S. This causes the rotor 200 to rotate at a maximum torque in the forward direction Rs. At the initial pausing mode p2, the U phase at N attracts the magnet m2 at S but repulses the magnet m3 at N hence allowing the rotor 200 to rotate at the maximum torque in the forward direction Rs. At the initial pausing mode p3, the attraction between the U phase at N and the magnet m2 at S is balanced with the attraction between the W phase at S and the magnet m1 at N. This permits no movement of the rotor 200.

At the initial pausing mode p4, the magnet m2 at N is attracted by the W phase at S while the magnet m1 at S is repulsed by the same. This causes the rotor 200 to rotate in the reverse direction Rr. At the initial pausing mode p5, the U phase at N attracts the magnet m3 at S but repulses the magnet m2 at N hence allowing the rotor 200 to rotate further in the reverse direction Rr. At the initial pausing mode p6, the repulsion between the U phase at N and the magnet m2 at N is balanced with the repulsion between the W phase at S and the magnet m1 at S. This permits no movement of the rotor 200.

As described, the startup torque may be generated non or too small at the initial pausing modes p3 and p6 thus disallowing the brushless motor to start up. In particular, when the brushless motor is linked to a heavy load and thus required to generate a large torque, this disadvantage will be significant. For example, the motor for starting an internal combustion engine, even if its output is great, may fail to generate a desired level of the startup torque because the friction in the engine is too high. At the initial pausing modes p4 and p5, the rotor rotates in the reverse direction and fails to generate a desired magnitude of the induced voltage needed for detecting the position of the rotor, hence inhibiting any normal energizing action. More particularly, by force commutation, the motor when remains free in the movement can be rotated in the forward direction two times out of six trials or at ⅓ of the probability.

SUMMARY OF THE INVENTION

It is hence an object of the present invention to provide a method of starting an electric brushless rotating machine which can generate a great level of the startup torque with no use of rotor position detecting elements. Another object of the present invention is to provide a method of starting an electric brushless rotating machine which can shift from the force commutation to a common operation simply and smoothly.

It is a further object of the present invention to provide a method of starting an electric brushless rotating machine which can continue to supply an upper limit level of current during the forced commutation thus to generate a climb over torque.

A first feature of the present invention is that a method of starting an electric brushless rotating machine for driving an internal combustion engine which has a magnetic rotor joined to an output shaft of the internal combustion engine and a set of stator windings of a first phase, a second phase, and a third phase arranged at equal phase intervals of an electric angle of 120 degrees so that the stator windings are energized in a sequence for forced commutation according to a rotating position detecting signal from the rotor, comprising the steps of, energizing between any two of the first, second, and third phase stator windings for initial magnetization at the startup to hold the magnetic rotor at a position, carrying out the forced commutation to energize the windings of the phases in a sequence while gradually increasing the level of the energization for forcefully rotating the magnet rotor, and generating the rotating position detecting signal from a voltage signal induced on the not-energized windings during the forced commutation and carrying out a normal action of the energization based on the rotating position detecting signal thus allowing the magnetic rotor to drive the output shaft of the internal combustion engine, and canceling the energization when the number of revolutions or the full turning motion in the internal combustion engine determined from the rotating position detecting signal reaches its predetermined level or times.

According to this feature, the internal combustion engine can be started up by a large level of the startup torque with no help of position detecting elements. The electric brushless rotating machine can hence be used as a brushless starter motor.

A second feature of the present invention is that the timing for switching from the forced commutation to the normal energization is taken when the number of revolutions or the full turning motion determined from the rotating position detecting signal reaches its predetermined level or times.

According to this feature, when the number of revolutions of the internal combustion engine has reached a specific number or the relationship between the commutation and the revolution has turned to substantially a stable state, the operation is automatically switched to the normal mode. This allows the switching of the mode to be executed simply and smoothly.

A third feature of the present invention is that the duty of PWM during the energization after the completion of the initial magnetization is gradually increased with a limiter arranged for limiting the energizing current to a specific level.

According to this feature, the startup to a desired number of revolutions can smoothly be conducted while the capacity of a driver for energization remains minimized.

A fourth feature of the present invention allows the energizing current to be gradually increased in the amount for the initial magnetization while being monitored not to exceed a predetermined level and when reaching the level, to be held at its level for continuous energization.

According to this feature, the upper limit level of the current can continuously be supplied during the forced commutation. As a result, the method of starting an electric brushless rotating machine can produce a greater startup torque. When the climb over torque is required for starting an internal combustion engine of a large startup torque type, it can simply be provided with no use of position sensors.

A fifth feature of the invention is that the rotating position detecting signal is determined from a voltage signal induced on the windings of the magnetic rotor not energized by the forced commutation and when the number of revolutions or the fully rotating motion reaches its predetermined level or times, the rotating position detecting signal is used for controlling the energization to the winding of each phase.

According to this feature, when the number of revolutions or the full turning motion reaches its predetermined level or times, i.e. the relationship between the commutation and the rotation becomes at a degree of stability, the operation can automatically be switched to a normal action by the switching based on the number of revolutions.

A sixth feature of the invention is that the energization is canceled when the energizing current exceeds the predetermined level.

According to this feature, the initial magnetization can be prevented from overload operations.

A seventh feature of the present invention allows the energization to each phase winding to be controlled through quantitatively increasing or decreasing the duty of PWM.

According to this feature, the energization to each phase winding can be controlled by a simple means.

DETAILED DESCRIPTION OF THE PREFERRED EMBODIMENTS

Figure 1:
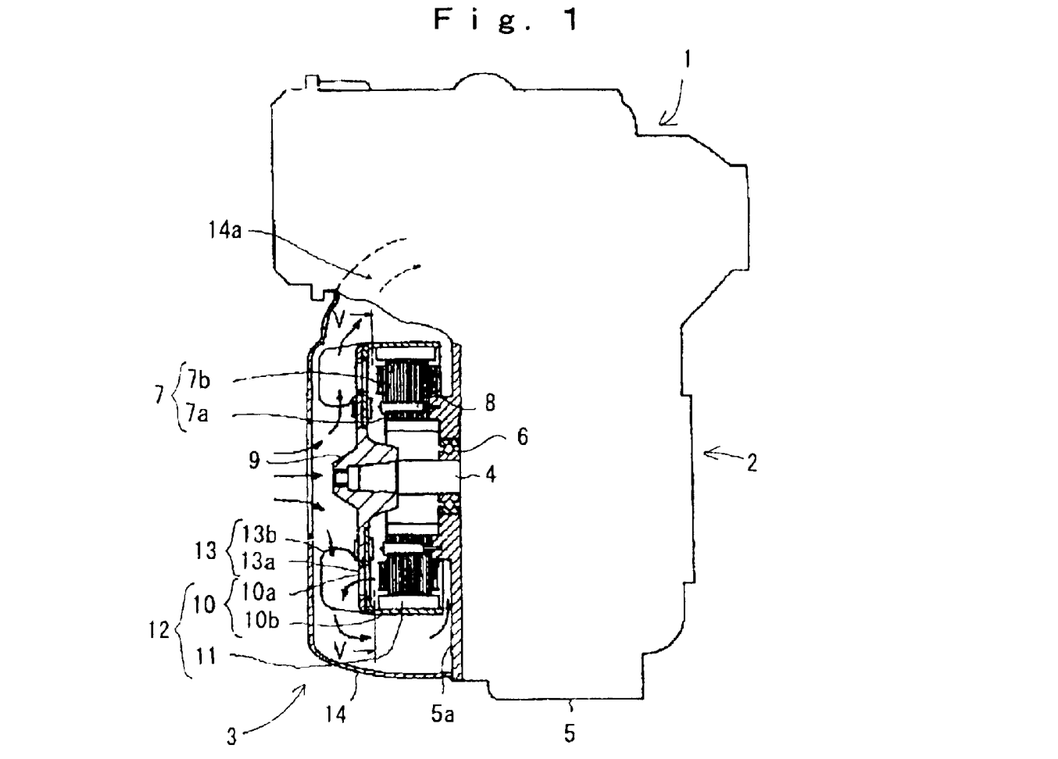
FIG. 1 is a side view of one embodiment of an electric brushless rotating machine in the form of an engine generator system according to the present invention.
Figure 2:
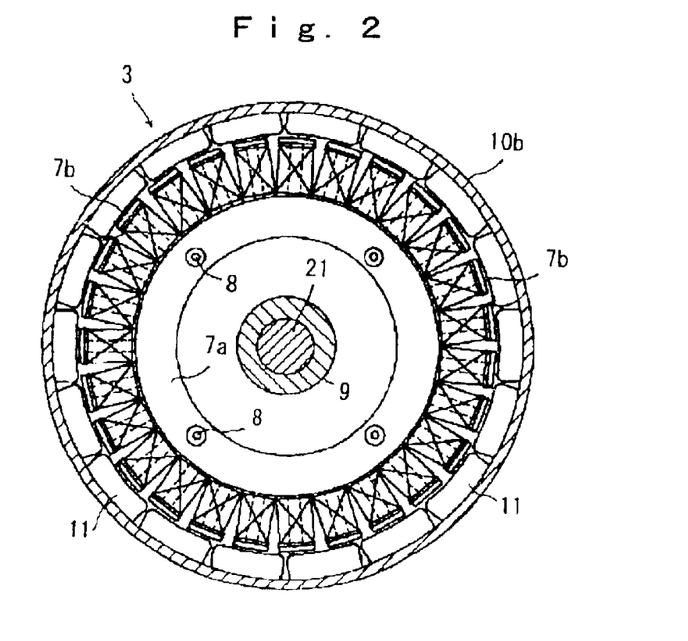
FIG. 2 is a cross sectional view taken along the line V—V of FIG. 1.

One embodiment of the present invention will be described in mode detail referring to the relevant drawings. FIG. 1 is a side view of an electric brushless rotating machine of the embodiment in the form of an engine generator system. FIG. 2 is a cross sectional view taken along the line V—V of FIG. 1.

The engine generator system 1 includes an engine 2 and a generator 3. The generator 3 is a magnet type multi-pole power generator. The engine 2 has a crank shaft 4 thereof supported by a bearing 6 installed in a side wall 5a of a crank case 5 to extend at one end outwardly of the engine 2. A star-shaped annular iron core 7 is fixedly mounted by bolts 8 to a boss region about the crank shaft 4 of the side wall 5a of the crank case 5. The iron core 7 comprises an annular center yoke portion 7a with twenty seven projections 7b extending radially from the center yoke portion.

The projections 7b have three-phase alternate windings provided thereon thus constituting a stator 8. The iron core 7 is multi-poled for generating a large output of power and its center yoke portion 7a and projection 7b are decreased in the radial length thus contributing to the lower weight of the system.

The crank shaft 4 has a hub 9 of a forged member fitted onto the distal end thereof. The hub 9 is linked to a flywheel 10 which also acts as a rotor yoke. The flywheel 10 is a pressed member of a cup-like shape comprising a disk portion 10a and a cylinder portion 10b. The disk portion 10a is fixedly joined to the hub 9 so that the cylinder portion 10b encloses the outsides of the projections 7b of the iron core 7.

Eighteen neodymium magnets 11 having higher magnetism are circumferentially mounted on the inner side of the cylinder portion 10b of the flywheel 10 thus constituting a magnetic rotor 12 of an outer rotor type. The rotor 12 has the magnets 11 aligned tightly on the inner side of the cylinder portion 10b to have a sufficient mass and can hence function successfully as the flywheel.

A cooling fan 13 is mounted to the disk portion 10a of the flywheel 10. The cooling fan 13 has a set of blades 13b provided upright and arranged circumferentially on one side of an annular base 13a thereof. The annular base 13a is fixedly mounted to the outer side of the disk portion 10a of the flywheel 10. The cooling fan 13 is enclosed in a fan cover 14 which provides a cooling air passage 14a extending from the outer side of the flywheel 10 to the engine 2.

Figure 3:
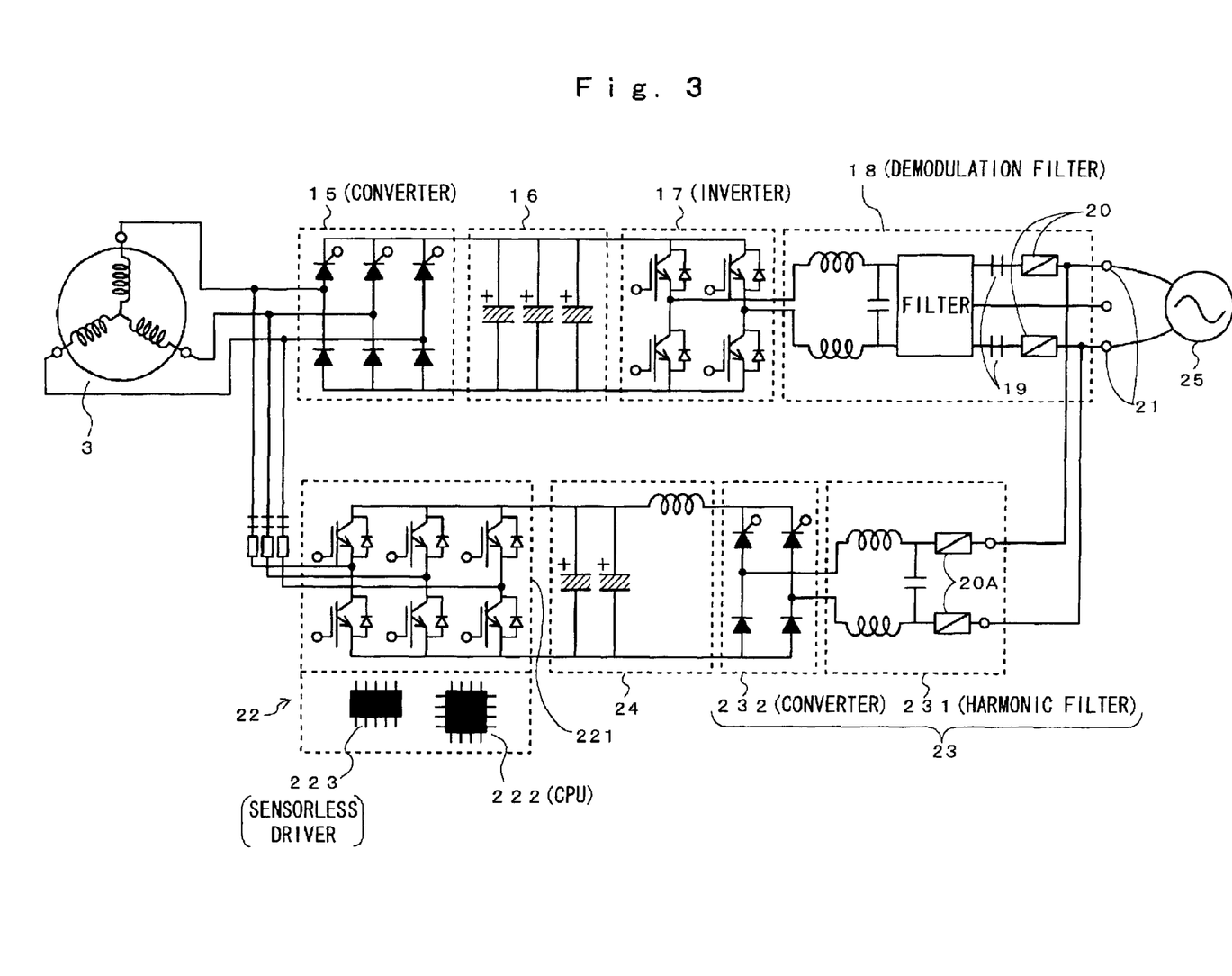
FIG. 3 is a schematic view of the engine generator system.

FIG. 3 is a schematic view of the engine generator system 1. The generator 3 is driven by the (internal combustion) engine 2 to generate a three-phase alternating current. The alternating current output of the generator 3 is full-wave rectified to a direct current by a converter 15 which comprises a rectifying circuit having a group of semiconductor rectifier devices connected in a bridge form. The direct current output of the converter 15 is then smoothed by a capacitor smoothing circuit 16 and transferred to an inverter 17 where it is converted into an alternating current at a desired frequency by the FET bridge circuit of the inverter 17. The alternating current output of the inverter 17 is received by a demodulation filter 18 where a lower frequency component (e.g. commercial frequencies) is passed through. The alternating current passed through the demodulation filter 18 is transferred via a relay 19 and a fuse 20 to an output terminal 21. The relay 19 remains open at the startup of the engine 2 and is then closed when the engine 2 runs to a specific level.

The generator 3 in the engine generator system 1 is also used as a starter for starting the engine 2. For the purpose, the generator 3 includes a starter driver 22. A rectifying circuit 23 and a smoothing circuit 24 are provided for supplying the starter driver 22 with a current for starting the engine 2. The rectifying circuit 23 comprises a harmonic filter 231 and a converter 232. The harmonic filter 231 has a fuse 20A and is connected by the fuse 20A to the output terminal 21. The output of the generator 3 is connected to, for example, a single-phase power source 25 at 200 VAC and receives the alternating current from the source 25 for the startup action. The alternating current is transmitted to the harmonic filter 231 where its harmonic is removed off, converted to a direct current by the converter 232, and received as a power supply via the smoothing circuit 24 by the starter driver 22.

The starter driver 22 supplies the three-phase windings of the generator 3 in a predetermined sequence with the current for starting the engine 2. For sequentially supplying the windings with the current, a switching device (FET) 221, a CPU 222, and a sensorless driver 223 employing no sensor (magnetic pole detector) for detecting the location of the rotor 12. As the rotor rotates, the sensorless driver 223 measures the location of the rotor from voltage signals induced on the first, second, and third stator windings arranged at equal intervals of a 120-degree phase difference and determines the energization of the stator windings.

Figure 4:
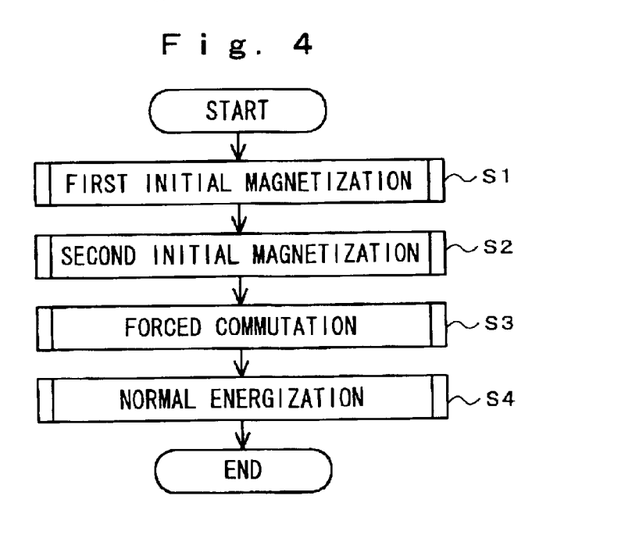
FIG. 4 is a flowchart for controlling the startup of the engine generator system.

FIG. 4 is a flowchart for controlling the startup of the engine generator system 1. When the generator 3 starts operating after its free pausing state, it may fail to have a desired startup torque during the forced commutation due to the negative positional relationship between the rotor and the stator. Also, the forward rotation may be interrupted. For compensation, Steps S1 and S2 conduct the first and the second action of the initial magnetization for shifting the rotor 12 to its desired location relative to the stator so that the desired startup torque is gained by the forced commutation and the forward rotation is encouraged. The initial magnetization then allows the rotor 12 to move to the desired location for gaining its maximum torque. The first and the second action of the initial magnetization are different in the energizing phase but equal in the procedure (as will be described later in more detail). Even when the rotor and the stator remain at their free pausing state or at any positional relationship (ranging from p1 to p6 in FIG. 13), the two initial magnetizing actions can shift the rotor 12 to a desired position for producing the maximum torque. If the duration of the initial magnetization is too short, the rotor may rotate without steadiness and jog at its stop position. The energizing period for the initial magnetization will hence extend until the rotor is located with stability, i.e. substantially one second.

At Step S3, the forced commutation is carried out. The forced commutation involves single-phase energization from the positional relationship between the rotor and the stator when the maximum torque is gained after the second action of the initial magnetization. The induced voltage from the non-energized phase is measured through the forced commutation and then used for detecting the position of the rotor 12. As the position of the rotor 12 has been determined from the induced voltage detected, the procedure goes to Step S4 where a normal procedure of the energization is carried out.

Figure 5:
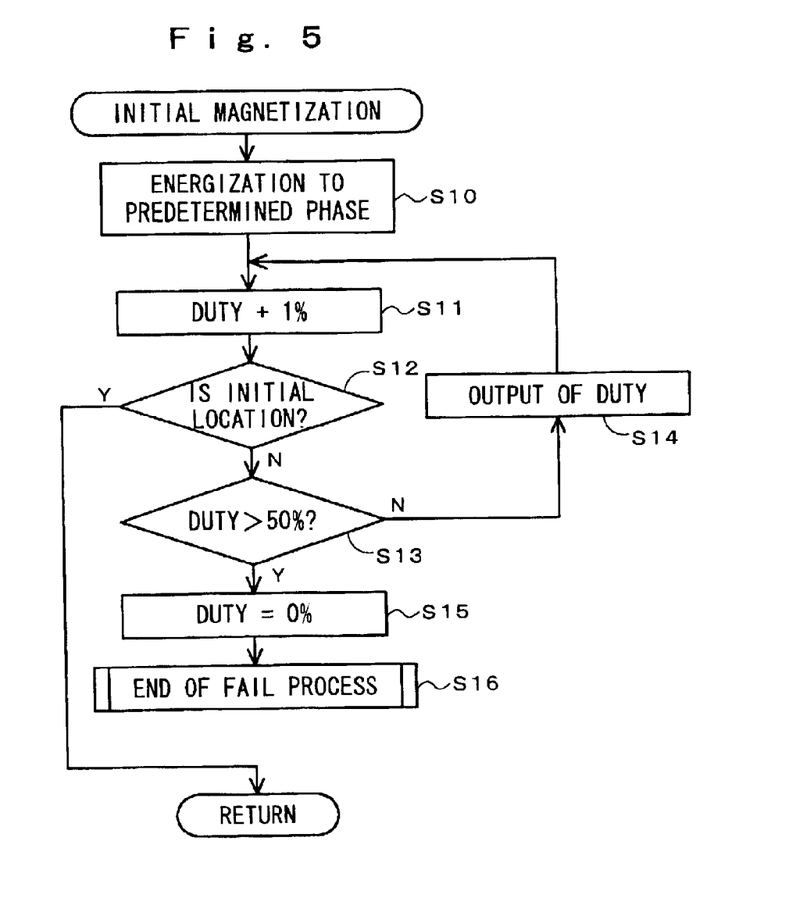
FIG. 5 is a flowchart for controlling the initial magnetization.

FIG. 5 is a flowchart for the initial magnetization (of both the first and the second action). At Step S10, the FET 221 is driven for energization of a predetermined phase. The first action of the initial magnetization energizes from the V phase to the U phase while the second action of the initial magnetization energizes from the V phase to the W phase. Step S11 follows where the initial value of energization duty is increased by a predetermined rate (for example, 1%). It is then examined at Step S12 whether or not the rotor 12 stops at any initial location (ranging from p1' to p6') in relation to the stator after a counter electromotive force is produced. When the rotor 12 remains not moved, the counter electromotive force is zero. Accordingly, the pausing of the rotor 12 at the initial location can be determined when the counter electromotive force is zero. At this step, once the counter electromotive force has been released, its value is examined whether zero or not. If no counter electromotive force has been released, it is judged "no" at the step. When "yes" at Step S12 is given, it is judged that the initial magnetization has been completed and the procedure goes to the next step. More specifically, when the first action of the initial magnetization is completed, the procedure goes to the second action of the initial magnetization. When the second action of the initial magnetization is completed, the procedure goes to the force commutation.

When it is judged "no" at Step S12, the procedure advances to Step S13 where it is examined whether the energization duty of the FET 221 exceeds an upper limit (e.g. 50%) or not. If not, the energization is carried out at the current duty (at Step S14) and the procedure returns to Step S11. When the rotor 12 fails to pause at the initial location with the duty reaching the upper limit or the counter electromotive force has not yet been released, it is judged "yes" at Step S13. This indicates a lockup state or an overloaded state and the duty is turned back to zero at Step S15 before the procedure is terminated with fail (at Step S16).

Figure 6:
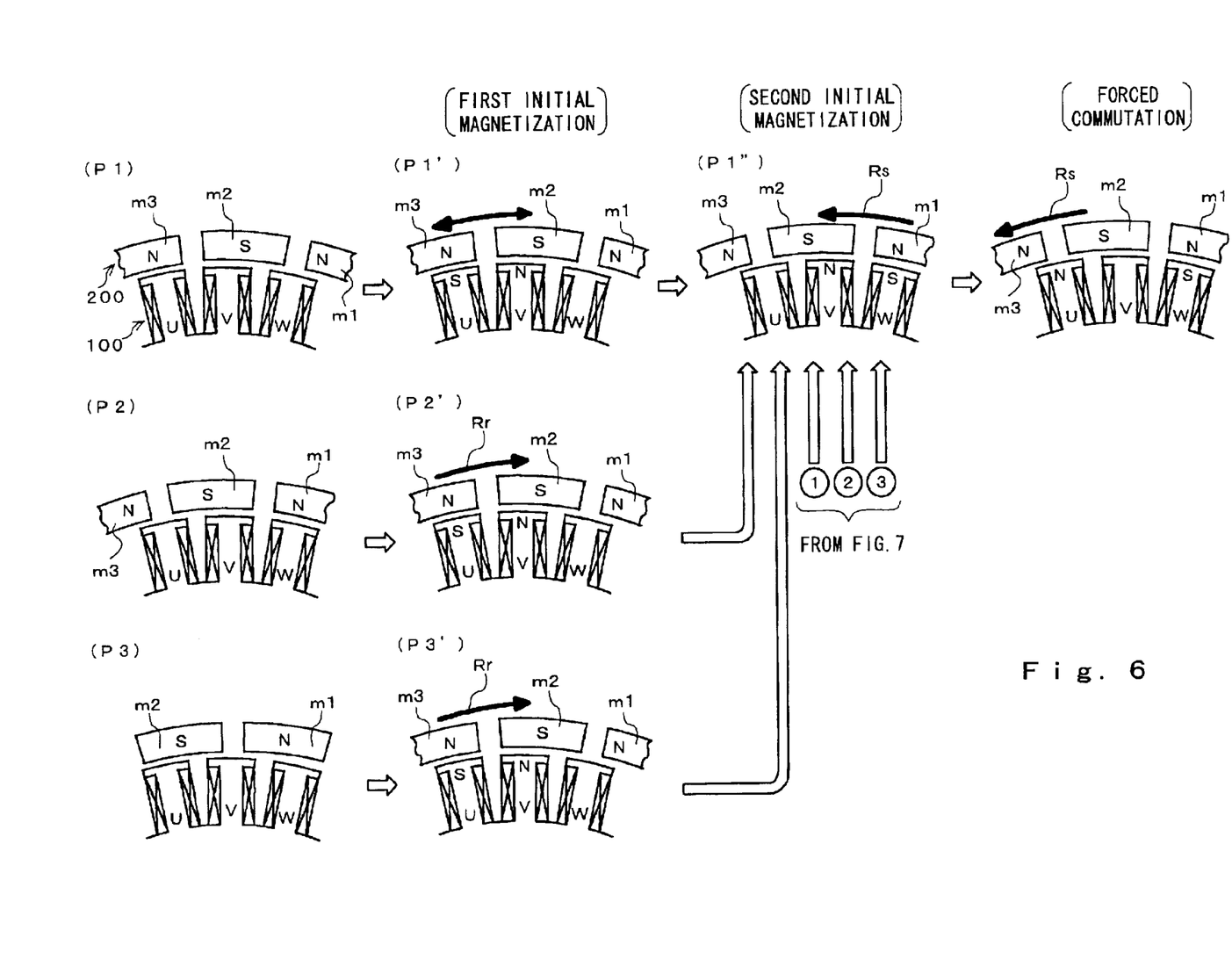
FIG. 6 is an explanatory view showing a fist and a second action of the initial magnetization.
Figure 7:
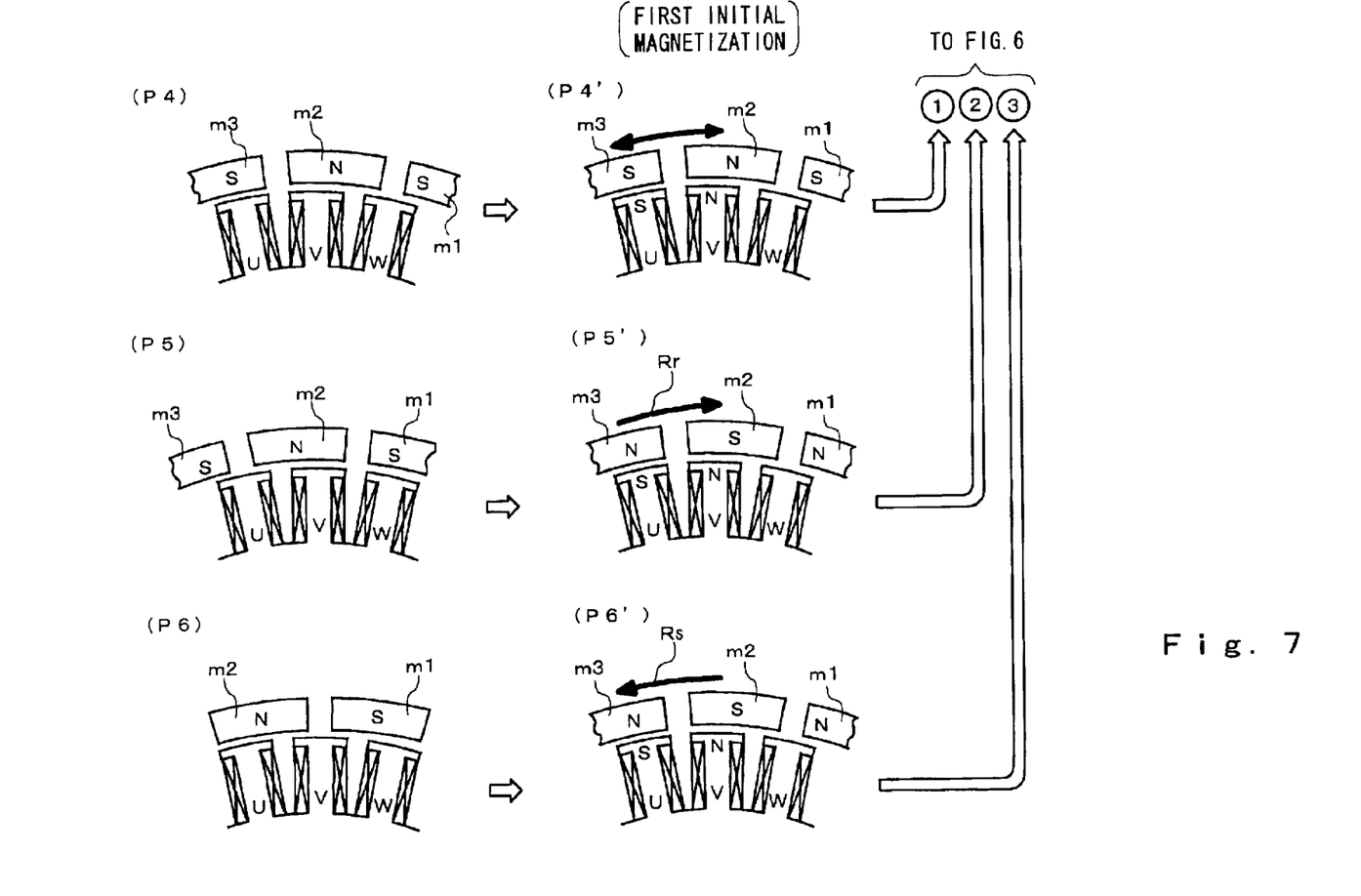
FIG. 7 is an explanatory view showing the fist and second actions of the initial magnetization.

The first and the second action of the initial magnetization will be explained in more detail referring to FIGS. 6 and 7. The initial pausing modes from p1 to p6 illustrated at the left end in FIGS. 6 and 7 indicate the initial location of the rotor 200 relative to the stator 100 when the generator stops spontaneously as are identical to those p1 to p6 shown in FIG. 13. When the energization from the V phase to the U phase is carried out for conducting the first action of the initial magnetization, the polarity of the V phase is turned to N and the polarity of the U phase is turned to S. This causes the permanent magnets m2 and m3 of the rotor 200 at the initial relationship p1 to be attracted by the N pole of the V phase and the S pole of the U phase respectively. As a result, the magnetic interaction between the stator 100 and the rotor 200 is balanced thus holding the rotor 200 at the location p1'. When the positional relationship between the stator 100 and the rotor 200 is at any of the locations p2 to p6, the rotor 200 is held by the same effect at the locations p2' to p6'. As apparent, the location p4' among p1' to p6' is different from the others p1' to p3', p5', and p6'.

When the energization from the V phase to the W phase is carried out for conducting the second action of the initial magnetization, the polarity of the V phase is turned to N and the polarity of the W phase is turned to S. This allows the S pole and the N pole of the rotor 200 to be repulsed and attracted respectively by the S pole of the W phase. As a result, the rotor 200 pauses with the permanent magnet m2 at S and the permanent magnet m1 at N held by the N pole of the V phase and the S pole of the W phase respectively. It is hence apparent that the pausing mode p1" is established when the second action of the initial magnetization is carried out at any pausing mode of p1' to p6' determined by the first action of the initial magnetization. More particularly, all the different pausing modes p1 to p6 can be converged to the single pausing mode p1" through the first and the second action of the initial magnetization. The positional relationship between the stator and the rotor involves the generation of a maximum of the startup torque in the revolution in the forward direction when the U and W phases are shifted to the N and S poles respectively by the succeeding forced commutation from the U phase to the W phase.

Accordingly, when the generator at the initial pausing mode p1" is driven by the forced commutation, it starts up with its rotor and stator generating the maximum torque and can thus rotate without difficulty in the forward direction.

Figure 11:
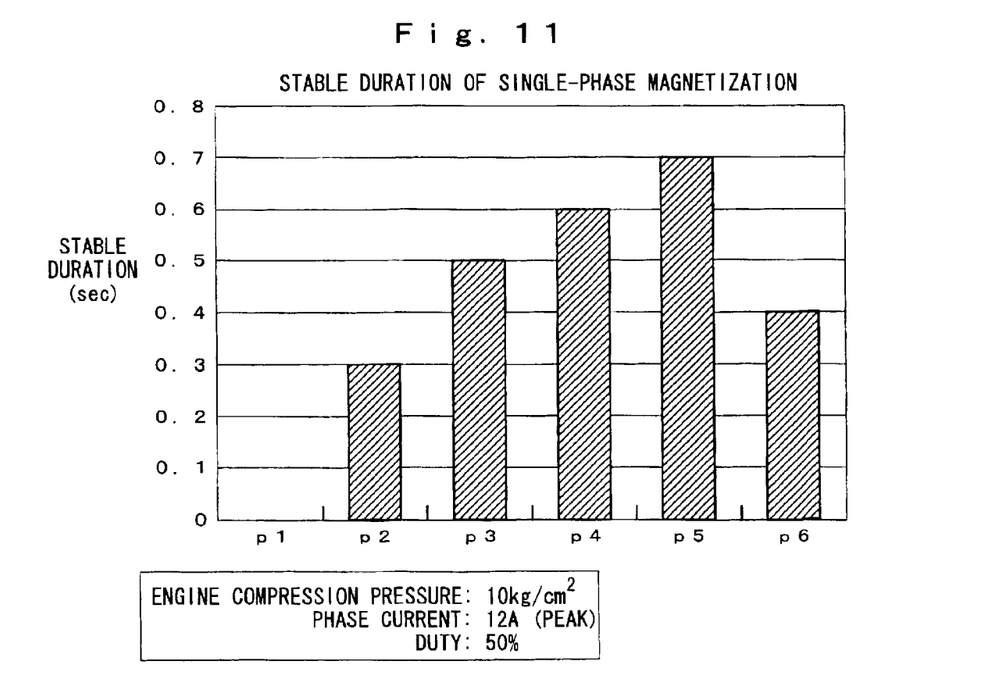
FIG. 11 is a diagram showing a stable duration of the rotor single-phase energized at the initial pausing modes p1 to p6.

The duration of the first and the second action of the initial magnetization will now be explained referring to FIG. 11. FIG. 11 illustrates the duration required before the rotation of the rotor becomes stable when the stator and the rotor at any of the initial pausing modes p1 to p6 have been single-phase magnetized. If the duration of the initial magnetization is too short, the rotor may rotate unstable and create a rocking motion at its pausing location. As apparent from FIG. 11, the duration from the startup of the initial magnetization and to the rotor becoming stable is a maximum or substantially 0.7 second at the initial pausing mode p5. It is hence desired that the duration for the initial magnetization before the rotation of the rotor becomes stable is substantially one second in consideration of a generous margin.

Figure 8:
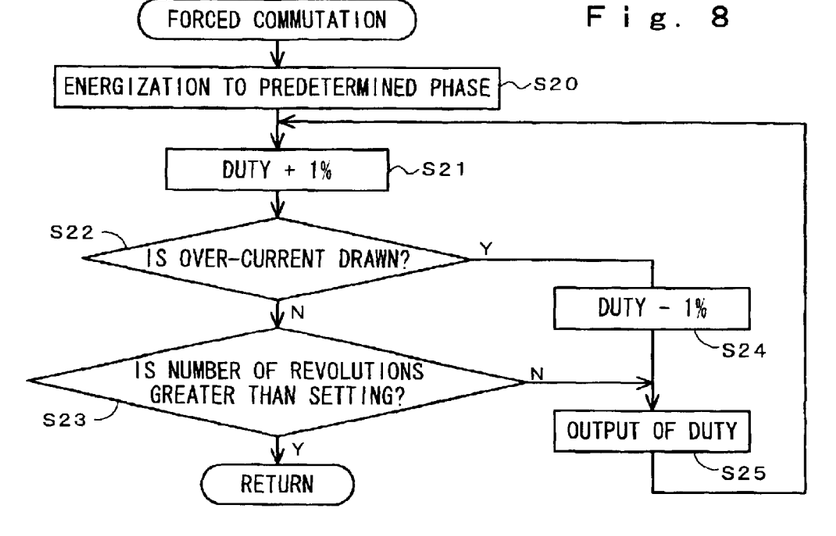
FIG. 8 is a flowchart for controlling the forced commutation in the first embodiment.

FIG. 8 is a flowchart showing a procedure of the forced commutation. At Step S20, the energization to a predetermined phase, e.g. from the U phase to the W phase, is conducted. Step S21 follows where the duty of PWM is gradually increased, for example, at steps of 1%. It is examined at Step S22 whether or not the current required for generating a torque of starting the engine or getting over the upper dead point for the compression exceeds an upper limit determined from the allowance for the energization (over-current).

When it is judged "yes" at Step S22 or the current exceeds the upper limit, the procedure jumps to Step S24 where the duty is reduced, for example, by 1% to protect a relevant component or switching device in the driver. At Step S25, the forced commutation is executed/continued at the 1% reduced duty.

When it is judged "no" at Step S22, the procedure moves to Step S23 for examining again whether or not the internal combustion engine has completed its full turning motion of predetermined times, for example, 10 times. When so, it is judged at Step S23 that the number of revolutions by the forced commutation is turned stable and the procedure for the force commutation is terminated before returning back to the normal energization procedure shown in FIG. 10. It is also possible to judge the rotating action from the number of revolutions per unit time instead of the foregoing predetermined number.

During the procedure, the sensorless driver 223 generates a rotating position detecting signal from the voltage induced on the not-energized windings and drives the rotor according to the rotating position detecting signal. Also, the number of revolutions or the full turning motion of predetermined times in the internal combustion engine may be measured from the rotating position detecting signal.

As the duty of PWM is gradually increased to the predetermined upper limit while the energizing current is limited to a specific level by the limiter, the energization to any of the windings can be efficient without a redundancy of the energizing current. Also, when the duty reaches its upper limit, it can be decreased to inhibit over-current in the energization to the windings thus permitting the continuous operation.

Figure 9:
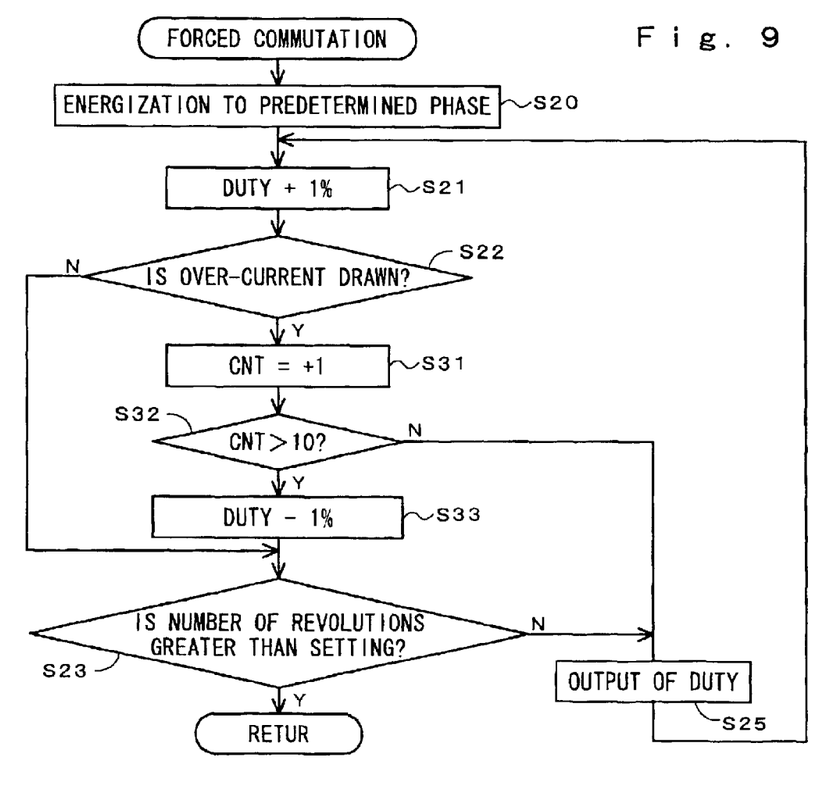
FIG. 9 is a flowchart for controlling the forced commutation in the second embodiment.

FIG. 9 is a flowchart showing a modification of the forced commutation. It may be necessary in respect of the capability of the switching element or the driver in the engine generator system 1 to carry out some times the forced commutation with over-currents exceeding the upper limit and overcome or climb over the upper dead point for the compression using a climb over torque. This is implemented by the modification of the forced commutation. Like steps are denoted by like numerals as those shown in FIG. 8 and will be explained in no more detail.

When it is judged at Step S22 that over-current is drawn, the procedure goes to Step S31 for increasing the count by one. It is then examined at Step S32 whether or not the count is greater than e.g. 10. When not, the procedure moves to Step S25 for carrying out the forced commutation at the duty of over-current. The forced commutation with over-current is continued until the count reaches 10. When the over-current remains (as judged "not" at Step S32), the duty is decreased by 1% at Step S33 to eliminate the over-current.

Figure 10:
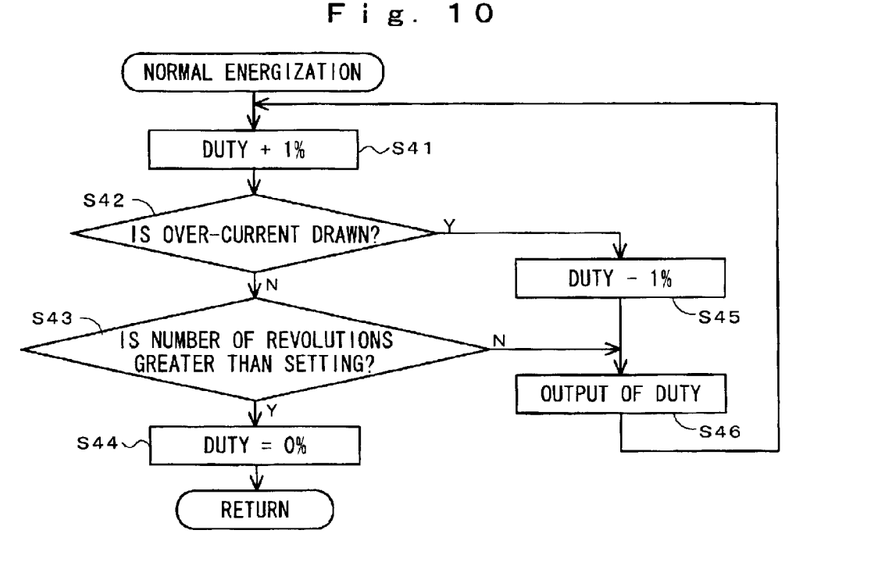
FIG. 10 is a flowchart for controlling a normal energization.

FIG. 10 is a flowchart for the normal energization. At Step S41, the duty is increased by 1%. It is then examined at Step S42 whether or not the duty reaches its upper limit or the over-current is drawn. When not, the procedure goes to Step S43 where it is examined whether or not the number of revolution is higher than a predetermined level (for example, 800 rpm). When it is judged "yes" at Step S43 or the engine has started, the action of the stator is completed. In other words, the procedure goes to Step S44 for turning the duty to 0%. When it is judged "yes" at Step S42, the procedure advances to Step S45 for decreasing the duty by 1% to eliminate the over-current. Step S46 follows where the action is executed at the decreased duty.

Figure 12:
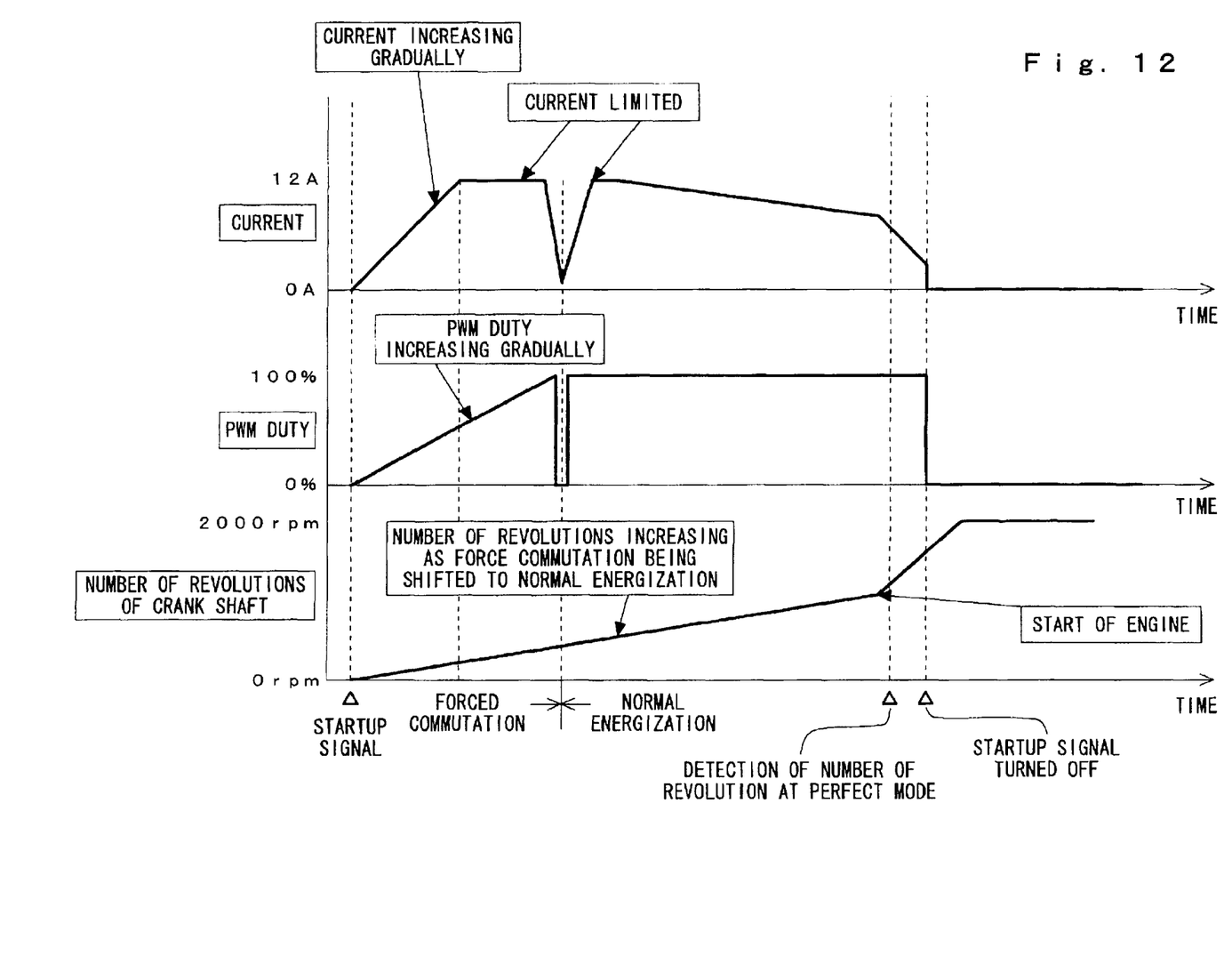
FIG. 12 is a diagram showing changes in the energizing current, the PWM duty, and the number of revolutions of a crank in the engine from the forced commutation after the completion of initial magnetization to a normal action of energization.

FIG. 12 is a graphic diagram showing changes in the energizing current, the PWM duty, and the number of revolutions of the crank shaft in the engine when the action of energization shifts from the forced commutation after the completion of the initial magnetization to the normal energization. It is apparent from the diagram that the number of revolutions in the engine is smoothly increased to a desired level from the forced commutation after the startup of the engine to the normal commutation.

As set forth above, the present invention defined in claims 1 to 3 allows the startup of an internal combustion engine of a large startup torque type to be carried out the action of an electric brushless rotating machine equipped with non of position detector devices such as Hall devices. It is also simply permitted that the electric brushless rotating machine serves as a brushless stator motor.

According to claim 2 of the present invention, the number of revolutions or the full turning motion of predetermined times in the internal combustion engine is measured from the rotating position detecting signal produced on the basis of a voltage signal induced on the not-energized windings and when the number reaches its predetermined level, the operation is automatically switched to a normal mode. This allows the forced commutation to be switched to a normal action of energization easily and smoothly.

According to claim 3 of the present invention, the duty of PWM during the energization after the completion of the initial magnetization is gradually increased with a limiter provided for limiting the energizing current to a specific level. As a result, the number of revolutions at the startup can smoothly be increased while the capacity of a driver for the energization remains minimized.

According to claim 4 of the present invention, the upper limit level of the current is continuously supplied during the forced commutation when a climb over torque is required for starting the internal combustion engine. As a result, the internal combustion engine of a large startup torque type can be started without difficulty.

According to claim 5 of the present invention, when the number of revolutions or the full turning motion measured from the rotating position detecting signal reaches its predetermined level or times, i.e. the relationship between the commutation and the rotation becomes at a degree of stability, the operation can automatically be switched to a normal operation based on the number of revolutions. As a result, the switching to the normal operation can be carried out easily and smoothly.

According to claim 6 of the present invention, the initial magnetization can be prevented from over-loading.

According to claim 7 of the present invention, the energization to each phase winding can be controlled by a simple means thus improving the operational reliability.

What is claimed is:

1. A method of starting an electric brushless rotating machine for driving an internal combustion engine which has a magnetic rotor joined to an output shaft of the internal combustion engine and a set of stator windings of a first phase, a second phase, and a third phase arranged at equal phase intervals of an electric angle of 120 degrees so that the stator windings are energized in a sequence for forced commutation according to a rotating position detecting signal from the rotor, comprising the steps of:

energizing between any two of the first, second, and third phase stator windings for initial magnetization at the startup to hold the magnetic rotor at a position;

carrying out the forced commutation to energize the windings of the phases in a sequence while gradually increasing the level of the energization for forcefully rotating the magnet rotor; and generating the rotating position detecting signal from a voltage signal induced on the not-energized windings during the forced commutation and carrying out a normal action of the energization based on the rotating position detecting signal thus allowing the magnetic rotor to drive the output shaft of the internal combustion engine, and canceling the energization when the number of revolutions or the full turning motion in the internal combustion engine determined from the rotating position detecting signal reaches its predetermined level or times.

2. A method of starting an electric brushless rotating machine for driving an internal combustion engine according to claim 1, wherein the timing for switching from the forced commutation to the normal energization is taken when the number of revolutions or the full turning motion determined from the rotating position detecting signal reaches its predetermined level or times.

3. A method of starting an electric brushless rotating machine for driving an internal combustion engine according to claim 1 or 2, wherein the duty of PWM during the energization after the completion of the initial magnetization is gradually increased with a limiter arranged for limiting the energizing current to a specific level.

4. A method of starting an electric brushless rotating machines for driving an internal combustion engine according to claim 1, wherein the energizing current during the initial magnetization is gradually increased while being monitored not to exceed a predetermined level and when it reaches the predetermined level after the forced commutation, continuously supplied at the level.

5. A method of starting an electric brushless rotating machines for driving an internal combustion engine according to claim 4, wherein the rotating position detecting signal is determined from a voltage signal induced on the windings of the magnetic rotor not energized by the forced commutation and when the number of revolutions or the fully rotating motion reaches its predetermined level or times, the rotating position detecting signal is used for controlling the energization to the winding of each phase.

6. A method of starting an electric brushless rotating machines for driving an internal combustion engine according to claim 4, wherein the energization is canceled when the energizing current exceeds the predetermined level.

7. A method of starting an electric brushless rotating machines for driving an internal combustion engine according to claim 4, wherein the energization to the winding of each phase is controlled by quantitatively increasing or decreasing the duty of PWM.

* * * * *